(12) United States Patent
A et al.

(10) Patent No.: US 12,556,344 B2
(45) Date of Patent: Feb. 17, 2026

(54) MESSAGE TRANSMISSION BETWEEN POINTS OF PRESENCE

(71) Applicant: Juniper Networks, Inc., Sunnyvale, CA (US)

(72) Inventors: Chandrasekhar A, Bengaluru (IN); Jayanthi R, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 195 days.

(21) Appl. No.: 18/490,681

(22) Filed: Oct. 19, 2023

(65) Prior Publication Data

US 2025/0055647 A1 Feb. 13, 2025

(30) Foreign Application Priority Data

Aug. 9, 2023 (IN) .............................. 202341053364

(51) Int. Cl.
*H04L 5/00* (2006.01)
*H04L 1/1812* (2023.01)
*H04L 67/55* (2022.01)

(52) U.S. Cl.
CPC .......... *H04L 5/0055* (2013.01); *H04L 1/1812* (2013.01); *H04L 67/55* (2022.05)

(58) Field of Classification Search
CPC ...... H04L 5/0055; H04L 67/55; H04L 1/1812
See application file for complete search history.

(56) References Cited

U.S. PATENT DOCUMENTS

| | | | |
|---|---|---|---|
| 2014/0022951 A1* | 1/2014 | Lemieux | H04L 45/22 370/255 |
| 2018/0191813 A1* | 7/2018 | Harpaz | H04L 67/1023 |
| 2020/0084295 A1* | 3/2020 | Hayward | H04L 67/55 |
| 2021/0112033 A1* | 4/2021 | Saavedra | H04L 63/20 |
| 2022/0006726 A1* | 1/2022 | Michael | H04L 45/745 |
| 2022/0086218 A1* | 3/2022 | Sabella | H04M 15/66 |
| 2022/0086220 A1* | 3/2022 | Wragg | H04L 67/141 |
| 2022/0353732 A1* | 11/2022 | Filippou | H04W 28/0289 |
| 2024/0121221 A1* | 4/2024 | Shafiulla | H04L 63/0407 |

OTHER PUBLICATIONS

Extended European Search Report for European Application No. EP232161117 dated Jun. 7, 2024, 7 pages.

* cited by examiner

*Primary Examiner* — Chris Parry
*Assistant Examiner* — Hassan Abdur-Rahman Khan
(74) *Attorney, Agent, or Firm* — Harrity & Harrity, LLP

(57) ABSTRACT

In some implementations, one or more network devices may receive, by one or more network devices associated with a first point of presence (POP) in a first cloud deployment, a message associated with a tenant. The one or more network devices may identify based at least in part on the message, one or more second POPs, associated with the tenant, in one or more second cloud deployments. The one or more network devices may transmit the message to the one or more second POPs.

20 Claims, 10 Drawing Sheets

MESSAGE TRANSMISSION BETWEEN POINTS OF PRESENCE

CROSS-REFERENCE TO RELATED APPLICATION

This patent application claims priority to Indian Patent Application number 202341053364, filed on Aug. 9, 2023, and entitled "MESSAGE BUS PROXY FOR MULTI-CLOUD OR MULTI-TENANT ENVIRONMENTS." The disclosure of the prior application is considered part of and is incorporated by reference into this patent application.

BACKGROUND

A secure access service edge (SASE) architecture integrates networking and security while providing direct, protected access for geographically dispersed users. Secure service edge (SSE) capabilities leverage the cloud to optimize network and security experiences. SASE deployments can include central deployments and point of presence (POP) cloud deployments.

SUMMARY

Some implementations described herein relate to a method. The method may include receiving, by one or more network devices associated with a first point of presence (POP) in a first cloud deployment, a message associated with a tenant. The method may include identifying, by the one or more network devices, based at least in part on the message, one or more second POPs, associated with the tenant, in one or more second cloud deployments. The method may include transmitting, by the one or more network devices, the message to the one or more second POPs.

Some implementations described herein relate to one or more network devices. The one or more network devices may include one or more memories and one or more processors. The one or more processors may receive a message associated with a tenant. The one or more processors may identify, based at least in part on the message, one or more second POPs, associated with the tenant, in one or more second cloud deployments. The one or more processors may transmit the message to the one or more second POPs.

Some implementations described herein relate to a non-transitory computer-readable medium that stores a set of instructions. The set of instructions includes one or more instructions that, when executed by one or more processors of one or more network devices, may cause the one or more network devices to receive a message associated with a tenant. The one or more instructions, when executed by one or more processors of the one or more network devices, may cause the one or more network devices to identify, based at least in part on the message, one or more second POPs, associated with the tenant, in one or more second cloud deployments. The one or more of instructions, when executed by one or more processors of the one or more network devices, may cause the one or more network devices to transmit the message to the one or more second POPs.

DETAILED DESCRIPTION

Figure 1:
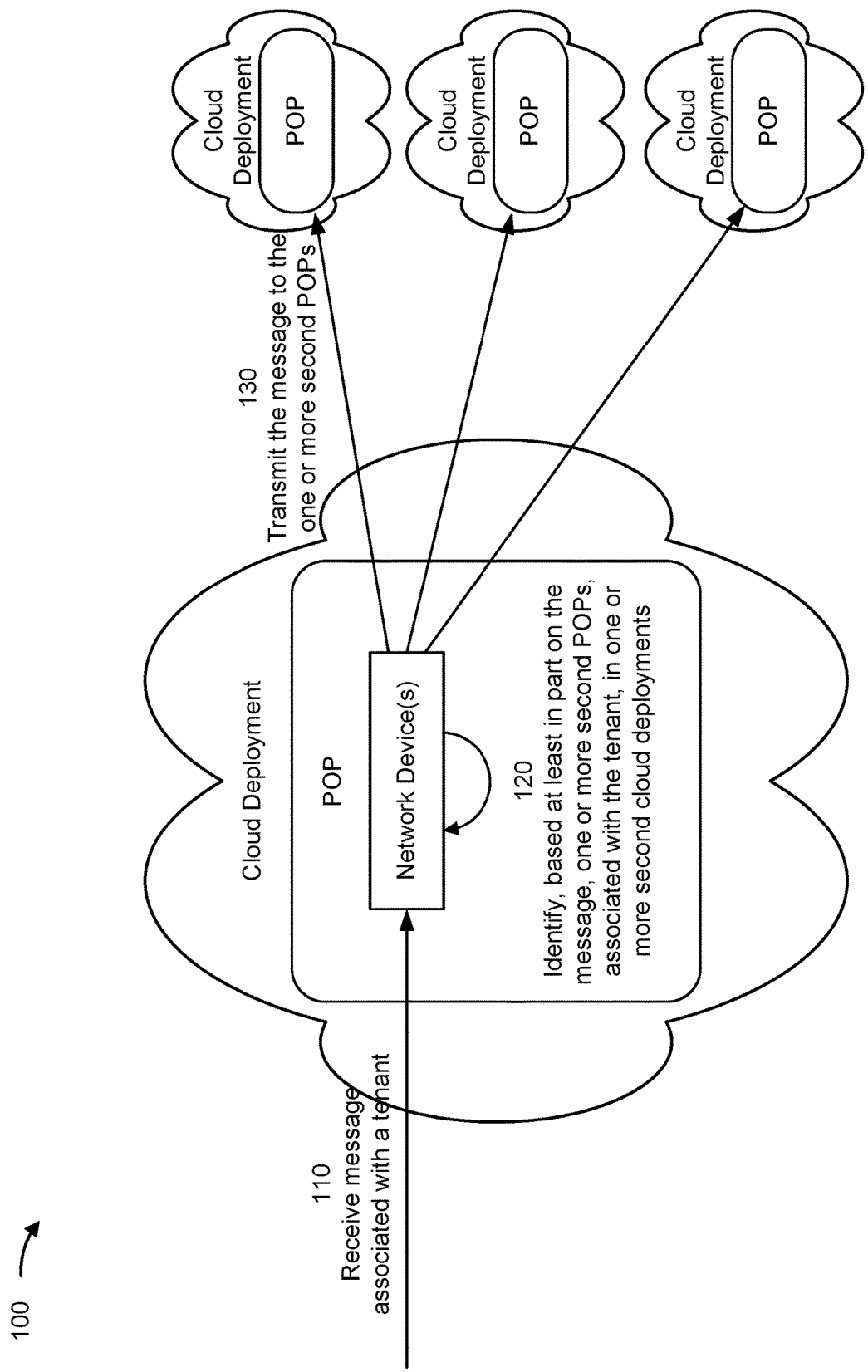
FIG. 1 is a diagram of an example implementation associated with message transmission between POPs.

The following detailed description of example implementations refers to the accompanying drawings. The same reference numbers in different drawings may identify the same or similar elements.

In some tenant deployment topologies, messages that are transmitted among POPs without geographic constraints may fail to comply with general data protection regulation (GDPR) requirements. Some tenant deployment topologies may also lack programmability support for dynamic addition and/or removal of tenants and POPs.

Furthermore, in SAAS systems containing multiple services that share resources, a chatty tenant can consume most or all resources, which can impact other tenants and ultimately lead to unfair sharing of resources across tenants. For example, operations of one tenant can use resources that would otherwise be allocated for operations of other tenants. For example, bulk device operations of one tenant can queue (e.g., delay) simple device operation tasks of another tenant. Moreover, in cloud-based systems containing multiple services that share resources, a chatty service can consume most or all resources, which may impact other cloud-based services.

Some implementations described herein enable selective transmission (e.g., broadcasting and/or multicasting) of messages (e.g., traffic or content) with respect to a tenant across multiple clouds based on customer GDPR requirements. For example, a programmable message bus proxy deployed in a POP may transmit the messages based on tenant-chosen geo-deployments. In some examples, implementation described herein may support multi-central deployments (e.g., deployments involving multiple central POPs) based on tenant GDPR requirements. Messages may be broadcast or multicast based on the tenant-preferred central POP. Moreover, some aspects provide programmability support for dynamic addition and/or removal of tenants and POPs.

In some implementations, a multi-tenant SAAS environment may dynamically adjust resource allocation based on an incoming tenant message rate, allocate resources based on high-priority tenant requests, predict (e.g., forecast) message rates for tenants and proactively allocate resources, or the like. Some implementations support federation exclusiveness for a given service in a message bus proxy. The federation exclusiveness may be controllable at run-time through programmability. Some examples may enable ordered processing on a per-service basis while delivering the messages through federation.

As a result, some implementations described herein may help to ensure that multi-POP tenant deployment topologies comply with GDPR requirements. For example, multi-central deployments may help to ensure compliance with GDPR requirements. Some implementations may also enable programmability support for dynamic addition and/or removal of tenants and POPs. In some implementations, a multi-tenant SAAS environment may spread a load across tenants, use resources efficiently, handle high-priority tenant requests, use more resources without reducing response time, or the like. In some implementations, certain services may be prevented from consuming resources at the expense of other services.

FIG. 1 is a diagram of an example implementation 100 associated with message transmission between POPs. As shown in FIG. 1, example implementation 100 includes a plurality of POPs in respective cloud deployments. Each POP may include one or more network devices and may be associated with a tenant. These devices are described in more detail below in connection with FIG. 8 and FIG. 9.

As shown by reference number 110, the network device may receive a message (e.g., a payload message) associated with a tenant. The messages may include event messages, firewall policy configuration messages, security logs, or the like. In some examples, the message may include one or more of a logical grouping (e.g., a topic) associated with the message, a payload, or a message key associated with an order of a plurality of messages, including the message, that are associated with the message key. For example, the message may include the following data model:

```
type FederatedMessage struct {
  Topic string 'json:"topic"'
  Payload [ ]byte 'json:"payload"'
  POPs [ ]string 'json:"pops"'
  Messagekey string 'json:"messagekey"'
}
```

The topic field may contain an indication of a topic on which the message is delivered. The payload field may contain an opaque message payload. In some examples, the POPs field may contain an array of POPs where the message is to be delivered. In some examples, the POPs field may contain a value of "global," which may indicate that the message is to be delivered to all POPs. The message key field may contain a message key that helps to guarantee a certain message order for messages that share the same message key.

As shown by reference number 120, the network device may identify, based at least in part on the message, other POPs associated with the tenant. For example, the network device may identify the other POPs based on the value of the POPs field.

As shown by reference number 130, the network device may transmit the message to the other POPs. In some examples, the network device may multicast the message to one or more other POPs (e.g., in a case where the POPs field contains an array (e.g., subset) of POPs). In some examples, the network device may broadcast the message to all POPs that are associated with the tenant (e.g., in a case where the value of the POPS field is "global").

Transmitting the message to the other POPs may enable selective transmission (e.g., broadcasting and/or multicasting) of messages with respect to a tenant across multiple clouds based on customer GDPR requirements. For example, the network device may transmit the messages based on tenant-chosen geo-deployments. For example, transmitting the message may help to support multi-central deployments (e.g., deployments involving multiple central POPs) based on tenant GDPR requirements. For example, a Singapore POP may be designated as the central POP for a deployment tenant based in Asia, a Germany POP may be designated as the central POP for European deployment tenant, or the like.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
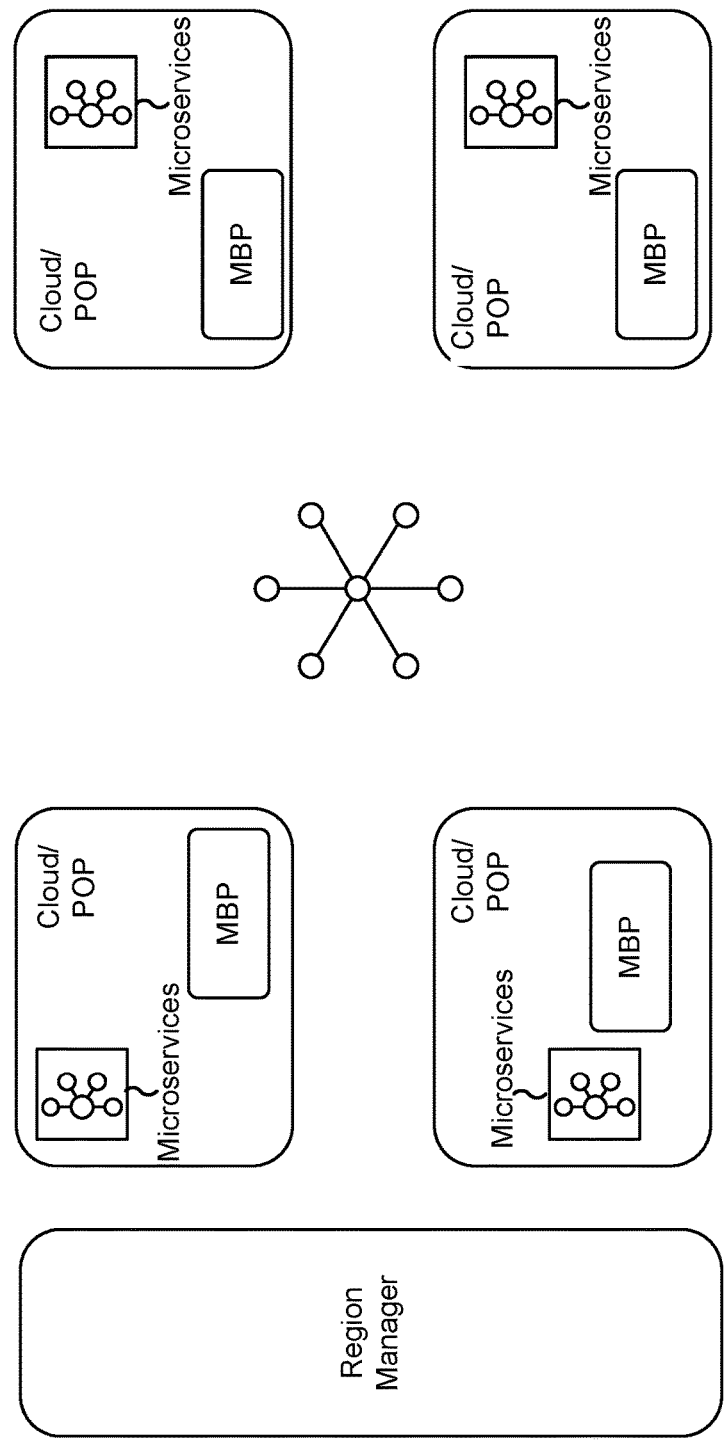
FIG. 2 is a diagram of an example implementation associated with a system including a plurality of POPs in respective cloud deployments and a region manager.

FIG. 2 is a diagram of an example implementation 200 associated with a system including a plurality of POPs in respective cloud deployments and a region manager (which may also be referred to as a POP manager). As shown, each cloud deployment includes a message bus proxy ("MBP"). The message bus proxies may be supported by any suitable technology, such as Kafka clusters, RabbitMQ, or the like. Each message bus proxy may be responsible for broadcasting or multicasting a message to remote message buses associated with the other POPs.

In some examples, the region manager may include a database (e.g., a global customer database) that maps the POPs to a tenant that uses the POPs. In some aspects, one of the message bus proxies may identify other POPs to which to send a message based at least in part on the database. In some examples, the database may maintain an inventory of all POPs associated with the tenant. In some examples, one of the POPs may be designated as a central POP, and the database may maintain a tenant-to-central-POP association. In some examples, the data may include the central POP and a list of POPs where SASE users can connect.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
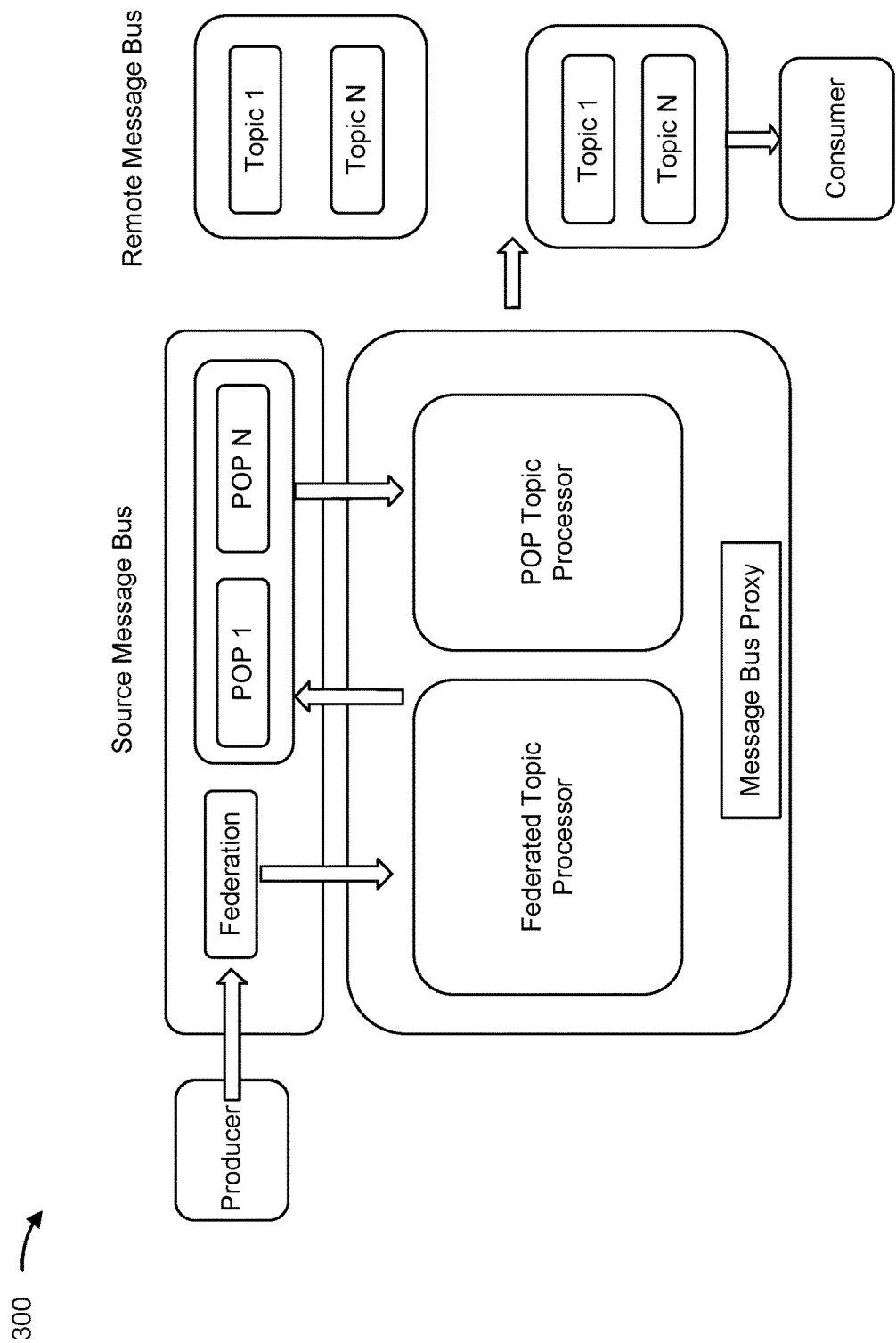
FIG. 3 is a diagram of an example implementation associated with queue topology in a POP deployment.

FIG. 3 is a diagram of an example implementation 300 associated with queue topology in a POP deployment. The topology shown in FIG. 3 may be used to buffer messages that are to be published to other regional or central POPs (e.g., clusters). As shown, a producer transmits a message to a source message bus that includes a queue associated with network federation ("Federation") and multiple queues respectively associated with POPs. In some examples, the queue associated with the network federation may be referred to as a federation topic (and thus the producer may publish the message to the federation topic), and the queues respectively associated with POPs may be referred to as POP topics. The message bus proxy may maintain a POP topic (e.g., queue) that corresponds to each POP associated with the tenant.

The source message bus may buffer the message in the queue associated with network federation. A federated topic processor (e.g., a consumer of the message bus proxy) may process the message in the federation topic and forward the message to one or more of the POP topics. For example, the federated topic processor may identify to which POP(s) the message is to be forwarded. For example, the POP topic processor may forward the message to POP 1 topic upon determining that the message is to be forwarded to a first remote message bus, the POP topic processor may forward the message to POP N topic upon determining that the message is to be forwarded to an Nth remote message bus, or the like.

The POP topic processor (e.g., a consumer of the message bus proxy) may process the message(s) in the POP topics and forward to messages to the POP clusters. For example, the POP topic processor may forward a message in the POP 1 topic to the first remote message bus, a message in the POP N topic to the Nth remote message bus, or the like. The POP topic processor may also be referred to as a region topic processor. The POP-specific topics may prevent a network issue with one POP impacting other POPs.

The message bus proxy that receives the message from the producer may be in a central POP or a non-central (e.g., regional) POP. A central POP may connect to multiple regional POPs, which may serve respective geographical locations for a given tenant. Thus, events (e.g., messages) may be broadcast or multicast among central and/or non-central cloud deployments, depending on the tenant-chosen geo-deployment, thereby complying with GDPR requirements.

In a case where the message bus proxy is in a central POP, the message bus proxy may receive one or more messages from the producer and buffer the message in the federated topic. The message bus proxy may determine an identifier of the tenant associated with the message and POPs information (e.g., the POP(s) where the message is to be transmitted). For example, the payload of the message may contain the tenant identifier. In some aspects, for every message in the federated topic, the message bus proxy (e.g., the federated topic processor) may identify an indication, in the message, that the message is associated with a global set of POPs associated with the tenant. For example, the message bus proxy may determine that the value of the POPS field is "global." Based on identifying the indication that the message is associated with the global set of POPs, the message bus proxy may identify the POPs where the message is to be transmitted. For example, the message bus proxy may obtain a list of POPs associated with the tenant (e.g., the tenant identifier). For example, the message bus proxy may obtain the list of POPs from the region manager (FIG. 2). The source message bus may buffer the message in the POP topics. For example, the federated topic processor may clone the message and post the message to every POP topic associated with the tenant (e.g., other than a topic associated with the central POP).

In a case where the message bus proxy is in a non-central POP, the message bus proxy may receive a message from the producer and buffer the message in the federated topic. The message bus proxy may determine an identifier of the tenant associated with the message and information associated with the central POP. For example, the payload of the message may contain the tenant identifier. In some aspects, for every message in the federated topic, the message bus proxy (e.g., the federated topic processor) may identify an indication, in the message, that the message is associated with a global set of POPs associated with the tenant. For example, the message bus proxy may determine that the value of the POPs field is "global." Based on identifying the indication that the message is associated with the global set of POPs, the message bus proxy may identify the central POP associated with the tenant (e.g., the tenant identifier). For example, the message bus proxy may obtain an indication of the central POP from the region manager (FIG. 2). The source message bus may buffer the message in the POP topics. For example, the federated topic processor may post the message to the central POP topic.

In some aspects, for a message bus proxy in a central or a non-central POP, the message bus proxy may identify an indication, in the message, that the message is associated with a subset of POPs associated with the tenant. For example, the message bus proxy may determine that the value of the POPS field includes an indication of the subset of POPs. Based on identifying the indication that the message is associated with the subset of POPs, the message bus proxy may identify the POPs where the message is to be transmitted (e.g., the subset of POPs). For example, the message bus proxy may obtain an indication of the subset of POPs from the region manager (FIG. 2). The source message bus may buffer the message in one or more of the POP topics. For example, the federated topic processor may clone the message and post the message to the POP topics where the message is to be transmitted (e.g., the subset of POPs).

In some aspects, for a message bus proxy in a central or a non-central POP, the message bus proxy (e.g., the POP topic processor) may obtain a topic name from the message and obtain an indication of the POP(s) (e.g., the central or non-central POP(s) where the message is to be transmitted). For example, the message bus proxy may obtain a POP Kafka endpoint from the region manager. The message bus proxy (e.g., the POP topic processor) may attempt to publish the message on the topic for the POP(s). In some aspects, the message bus proxy may receive, from the POP(s), an acknowledgement associated with the message (e.g., an acknowledgment that the message has been received). The acknowledgement may indicate that the message was successfully delivered. In some aspects, the message bus proxy may determine that a time window associated with acknowledgements associated with the message has expired. The message bus proxy may retransmit the message to the POP(s) (e.g., the message bus proxy may sleep and retry the message). Determining that the time window has expired and retransmitting the message may help to ensure that the message is successfully delivered.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
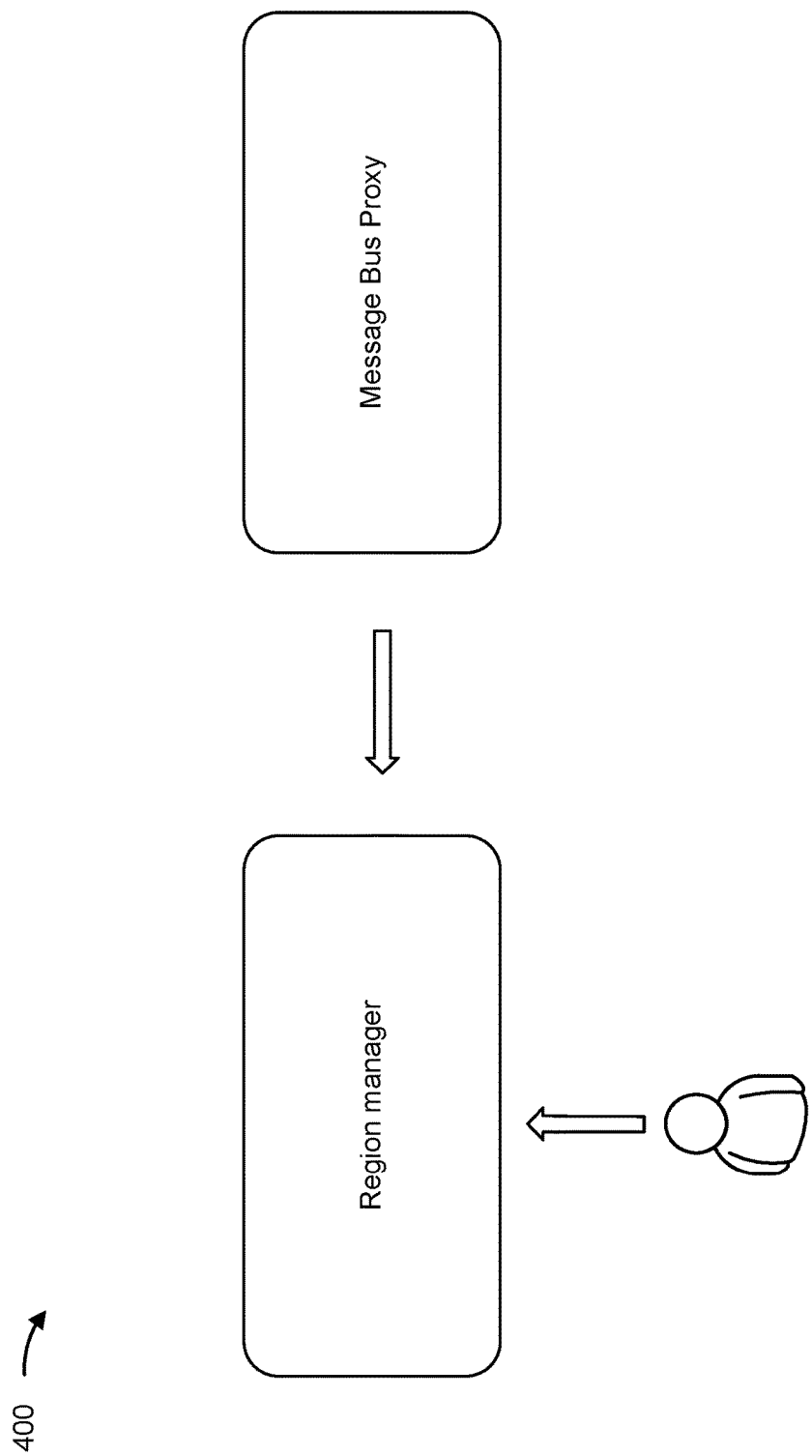
FIG. 4 is a diagram of an example implementation associated with programmability support.

FIG. 4 is a diagram of an example implementation 400 associated with programmability support. For example, the database maintained by the region manager may be dynamically programmable. As shown, a user (a network administrator associated with the tenant) and/or a message bus proxy may communicate with (e.g., dynamically program) the region manager.

In some aspects, the database may maintain a dynamic mapping of the POPs to the tenant. For example, new POPs may be added based on demand, which may enable the system to avoid downtime and thereby support the relevant service level agreement for the tenant. Application programming interfaces (APIs) may be provided to add new POPs (and/or an associated tenant) to the database. The database maintaining the dynamic mapping of the POPS to the tenant may enable the database to be dynamically updated to reflect changes in POPs associated with a tenant.

In some aspects, the database may maintain a dynamic indication of which of the POPS is a central POP for the tenant. For example, APIs may be provided to add tenant-to-POP associations, including the central POP and/or a list of POPs where the SASE users can connect. The database maintaining the dynamic indication of which of the POPs is a central POP for the tenant may enable the database to be dynamically updated to reflect changes in the central POP associated with a tenant.

In some examples, while coming up, the message bus proxy may read the deployment topology for the tenant. For every deployment topology change, the message bus proxy may detect deployment topology change events and update the deployment topology.

The following data model (e.g., a POP model) may enable programmability for POPs.

rw POP* [name]
   +--rw name
   +--rw description? string
   +--rw Kafka end point? string
   +--rw north-bound-loadlanacer? string
   +--rw south-bound-loadlanacer? string The following data model (e.g., a tenant-to-POP association model) may enable programmability for tenant-to-POP association.

+--rw tenant-region-association* [name]
   +--rw tenant-id
   +--rw central-po-id? string
   +--rw pop-ids*

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
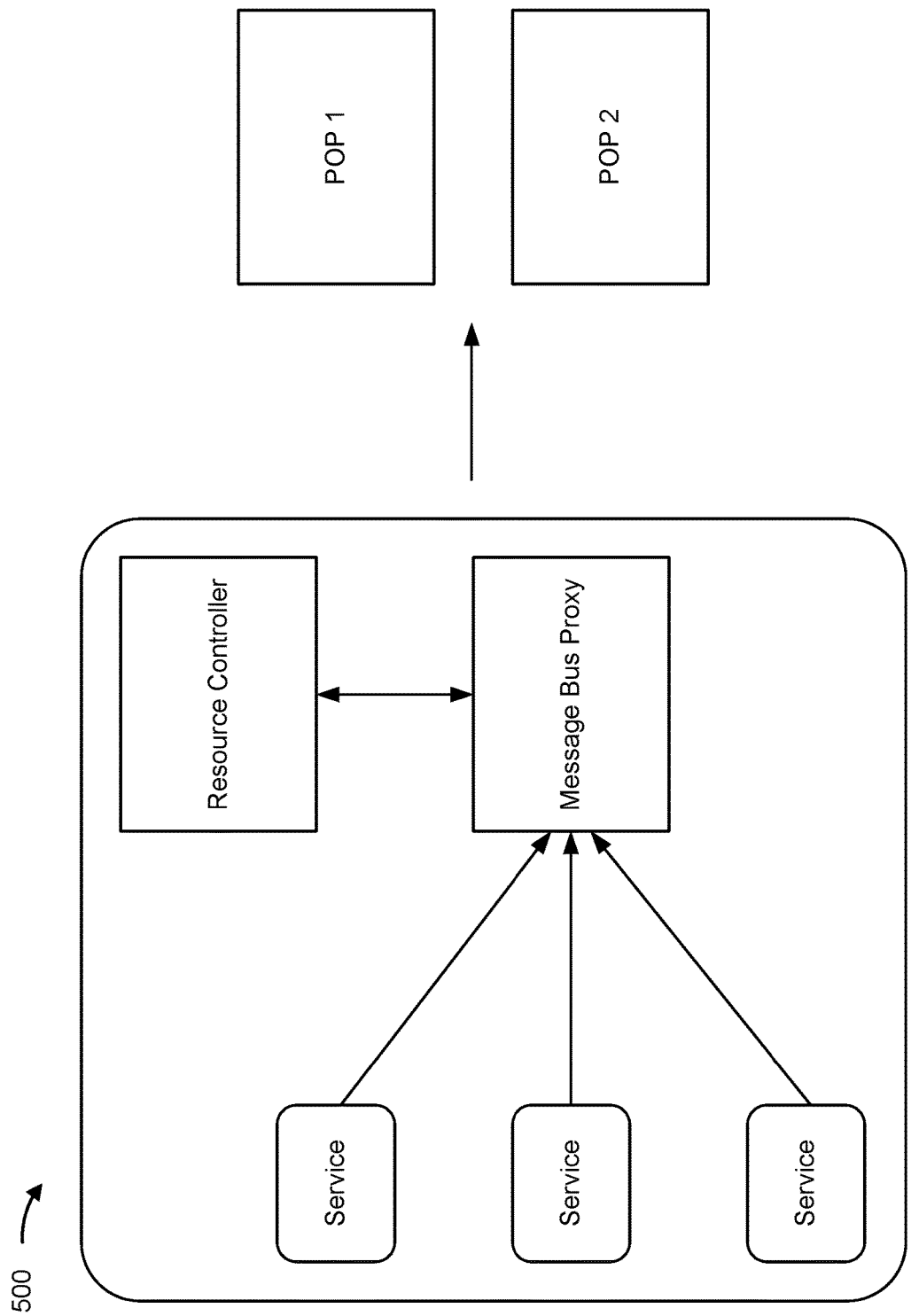
FIG. 5 is a diagram of an example implementation associated with a multi-tenant software-as-a-service (SAAS) environment.

FIG. 5 is a diagram of an example implementation 500 associated with a multi-tenant SAAS environment. SAAS is a software distribution model in which a cloud provider hosts applications and makes the applications available to end users over the Internet. The implementation 500 includes a plurality of cloud deployments or POPs. Each POP may include a plurality of services, a message bus proxy, and a resource controller. The resource controller may be a centralized controller that tracks compute resources and allocates the resources to a tenant job. For example, tenants in the SAAS environment may share the same compute and storage resources, which may improve the usage of the resources, and operating system (OS) schedulers may be designed to allocate and share the compute resources across processes.

In some aspects, a POP may receive a plurality of messages from a plurality of tenants and load-balance the plurality of messages across a plurality of resources (e.g., compute resources). For example, the message load may be spread across the tenants and/or instances. The plurality of messages may be associated with one or more tenants. As described above, the POP may further identify one or more POPs where the messages are to be transmitted and transmit the message to the one or more POPs. Load-balancing the plurality of messages may enable the compute resources to be shared across the tenants in such a way that end users are allocated an equitable share of the resources. For example, the message bus proxy may efficiently use resources and achieve equitable sharing.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

Figure 6:
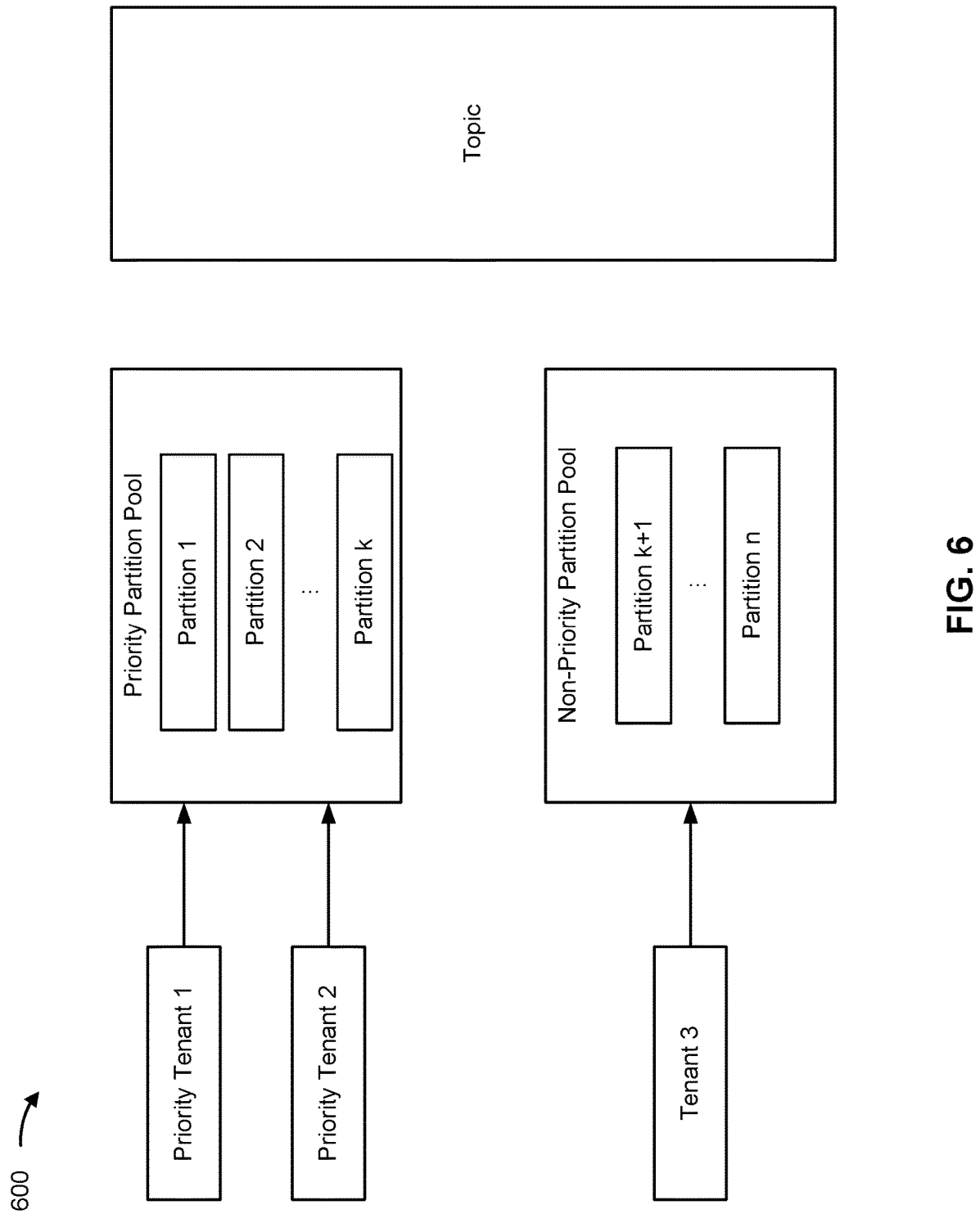
FIG. 6 is a diagram of an example implementation associated with load-balancing based on partitions.

FIG. 6 is a diagram of an example implementation 600 associated with load-balancing based on partitions. Implementation 600 includes a plurality of tenants, a plurality of partitions, and a topic. The plurality of tenants includes priority tenants and non-priority tenants, and the plurality of partitions includes partitions associated with the priority partition pool and partitions associated with a non-priority partition pool. Each partition may be associated with a set of resources (e.g., compute resources) that are to be load-balanced across messages associated with the tenants.

Every tenant may be soft-mapped to a partition. For example, the priority tenants are mapped to the priority partition pool, and the non-priority tenants are mapped to the non-priority partition pool. The mapping may change over time based on event rate (e.g., based on the rate of incoming messages, associated with a tenant, to be transmitted to other POPs). The resource controller may monitor the event rate for a given tenant and assign a weight for the tenant. Based on the event rate, the messages may be placed in the federated and POP topic partitions, and the resource controller may proactively redistribute the tenants among the partitions and/or auto-scale the message bus proxy by predicting (e.g., forecasting) the message rate of the tenant.

In some aspects, the POP (e.g., one or more network devices associated with the POP) may load-balance the plurality of messages based on a plurality of weights associated with a plurality of partitions and a plurality of weights associated with the plurality of tenants. For example, the POP may support load balancing by calculating a weight for every tenant and partition based on a message rate and load-balancing or redistributing the tenants to the partitions.

Partition weight may be calculated as follows. A pool of partitions where the messages are to be published may be represented as $P=P_1, P_2, P_3, \ldots P_n$. The partition weight may be calculated based on a message rate threshold and the current processing rate of each partition: $PW_i=MR_i/MR_t$, where $PW_i$ is the weight of partition 'i,' $MR_i$ is the message rate of partition 'i,' and $MR_t$ is the message rate threshold. In some examples, $PW_0=0.3$, $PW_1=0.5$, $PW_2=0.9$, or the like. Periodically (e.g., every five minutes), the message rate of each partition may be processed and, based on the message rate, a weight $W_i$ may be calculated for every partition.

Tenant weight may be calculated as follows. The tenant weight may be calculated based on a message rate threshold and the current processing rate of each tenant. In some examples, $TW_i=TMR_i/MR_t$, where $TW_i$ is the weight of tenant 'i,' $TMR_i$ is the message rate of tenant 'i,' and $MR_t$ is the message rate threshold. In some examples, $TW_0=0.1$, $TW_1=0.7$, $TW_2=0.9$, or the like. Periodically (e.g., every five minutes), the message rate of each tenant may be processed and, based on the message rate, a weight $W_i$ may be calculated for every tenant.

Load-balancing the plurality of messages based on the plurality of weights associated with the plurality of partitions and the plurality of weights associated with the plurality of tenants may enable the POP to balance the messages across instances in a weight-aware manner. The weights may be dynamically calculated based on message rate and tenant. Thus, the message bus proxy may be horizontally scalable.

In some aspects, the POP may load-balance one or more first messages among one or more first partitions based at least in part on the first messages being associated with a first tenant that is associated with a first priority of the first partitions. Additionally, or alternatively, the POP may load-balance one or more second messages among one or more second partitions based at least in part on the second messages being associated with a second tenant that is associated with a second priority of the second partitions. For example, the first priority may be higher than the second priority, the first partitions may be priority partitions, and the second priority may be non-priority partitions.

The partition allocation may be determined (e.g., periodically, such as once every hour) as follows. The available partition pool may be split based on the priority threshold 'k.' In some examples, $P=[P_1, P_2, P_3, \ldots P_k]+[P_{k+1} \ldots P_n]$, the priority partition pool may be $\Sigma PP_i$, where $i=1 \ldots k$, and the nonpriority partition pool may be $\Sigma NPP_i$, where $i=k+1 \ldots n$.

For every partition i within the priority partition pool $PP_i$, if weight $PW_i>1$, then the partition allocation may be determined to optimally map tenants to partitions without exceeding the limit (e.g., the threshold of $PW_i>1$). If all of the partitions have reached the threshold, then the message bus proxy may be auto-scaled. In some examples, $\Sigma PW_i=n$, where $i=0 \ldots n$.

For every partition j within nonpriority partition pool $NPP_j$, if weight $PW_j>1$, then the partition allocation may be determined to optimally map tenants to partitions without exceeding the limit (e.g., the threshold of $PW_j>1$). If all of the partitions have reached the threshold, then the message bus proxy may be auto-scaled. In some examples, $\Sigma PW_j=n$, where $j=0 \ldots n$.

In some aspects, the POP may predict a message rate associated with the tenant. For example, the message rate may be predicted (e.g., forecasted). Based on current and past message rates for a given tenant, a future rate can be predicted using machine learning processes (e.g., machine learning algorithms). For example, the message rate may be predicted using univariate time series prediction.

Univariate time series prediction may involve at least two variables: time and message count. Based on at least these two variables, the message rate may be predicted. The message rates may be analyzed at uniform rates (e.g., every five minutes). For example, a univariate time series model may be created for every tenant separately. Each model may be fed with the message rate that is analyzed at uniform rates. For example, each model may be fed periodically (e.g., every five minutes).

In some examples, a tenant partition allocation may change. For example, the following process may be performed for every tenant. The process may be performed periodically (e.g., once every 24 hours). The process may involve obtaining the predicted rate (e.g., the rate predicted for the next day based on the model). The tenant predicted weight may be calculated as $TFW_i=TMR_i/MR_t$, where $TMR_i$ is the predicted message rate of tenant 'i' and $MR_t$ is the message rate threshold. The delta rate $DR_t$ may be calculated as $DR_t=TFW_i-TW_i$, where $TW_i$ is the predicted weight of tenant 'i.'

The predicted partition weight may be calculated using the predicted rate. If the tenant is a priority tenant, then $FPW_i=\Sigma PPW_i+DR_t$, where $FPW_i$ is the predicted (e.g., forecasted) weight of partition 'i' and $PPW_i$ is the weight of priority partition 'i.' If the tenant is a nonpriority tenant, then $FPW_i=\Sigma NPPW_i+DR_t$, where $NPPW_i$ is the weight of non-priority partition 'i.' If $FPW_i<1$, then no action may be taken; if $FPW_i \geq 1$, then the tenant may be redistributed among the partitions with $TFW_i$ as the weight in the priority partition pool (if the tenant is a priority tenant) or in the non-partition pool (if the tenant is a non-priority tenant).

Predicting the message rate associated with the tenant may enable efficient handling of the tenant distribution. For example, the tenants may be distributed proactively, thereby avoiding bottlenecking due to inefficient resource allocation.

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

Figure 7:
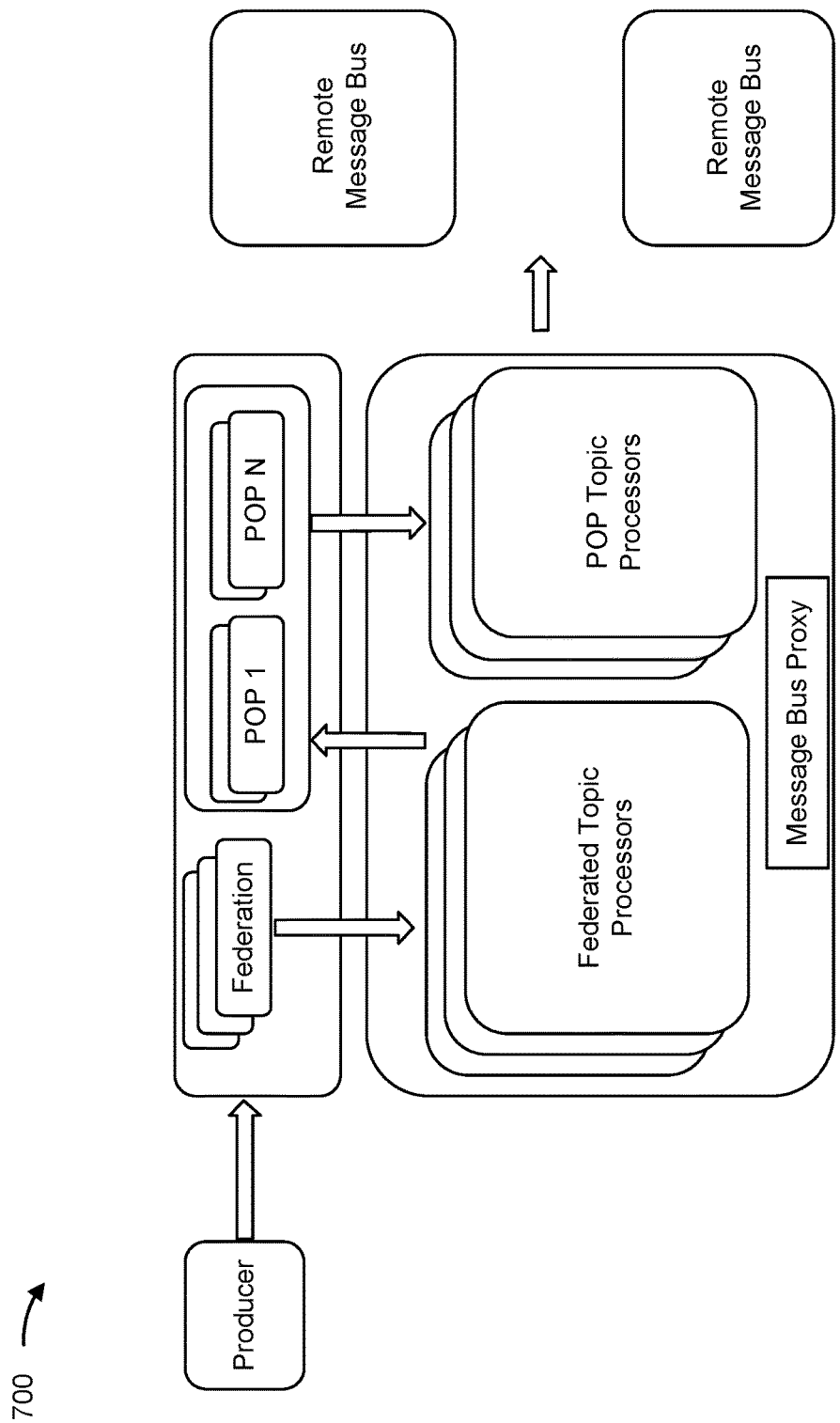
FIG. 7 is a diagram of an example implementation associated with programmable federation exclusiveness in message bus proxies in multi-cloud environments.

FIG. 7 is a diagram of an example implementation 700 associated with programmable federation exclusiveness in message bus proxies in multi-cloud environments. Implementation 700 may be similar to implementation 300 (FIG. 3) except that implementation 700 includes a plurality of federation topics and a plurality of sets of POP topics (e.g., a first set of POP 1-POP N topics, a second set of POP 1-POP N topics, or the like). Each federation topic and each set of POP 1-POP N topics may be associated with a service (e.g., a microservice). In some examples, a model may allow registration of a service processor (e.g., a federated processor and/or a POP topic processor) in the message bus proxy. The service processor may be configured at message bus proxy run time. The model may capture a category (e.g., a message category on which federation exclusiveness is to be created) and/or one or more service processor types and a corresponding configuration.

The message bus proxy may initialize the service processor based on the model and create dedicated federated topics and POP topics for the category. If the service processor is enabled with ordered processing, then a single thread may read the messages in bulk and publish the messages to one or more remote message buses, which may acknowledge the messages upon successful delivery. If the service processor is enabled with concurrent processing, then concurrent threads may read the messages in bulk and publish the messages to the remote message.

As example model is provided as follows:
processors:
   name: DefaultFederation
     batch_size: 2000
     batch_max_wait: 5
     enable_ordered_processing: true
   name: jobstore
     batch_size: 2000
     batch_max_wait: 5
   name: iam
     batch_size: 2000
     batch_max_wait: 5

The "name" field may provide the name of the processor. The "batch_size" field may provide a message quantity threshold (e.g., once the quantity of collected messages satisfies the "batch_size," the collected messages may be sent out as a single batch). The "batch_max_wait" field may provide a maximum time, in milliseconds, to wait for a batch-size of messages to be ready before the batch is sent (e.g., if the "batch_max_wait" is satisfied, then the collected messages may be sent even if the "batch_size" is not satisfied). The "enable_ordered_processing" field may enable ordered processing while delivering the messages to a remote message bus.

In some aspects, a message transmitted by the producer may be associated with one or more services (e.g., microservices), and the message bus proxy may buffer the message in a queue associated with the service. For example, the message bus proxy may buffer the message in a federation topic or a POP topic associated with the service. For example, a separate federated topic, separate POP topics, and a service processor may be created for every category of service. With respect to service processor creation, a federated processor and POP processors may be created for every service. In some examples, if ordered message processing is enabled, then a single federated and POP specific processor may be created. In some examples, if ordered message processing is enabled, then multiple federated and POP specific processors may be spawned. Buffering the message in a queue associated with the service may help to ensure that one service does not consume all resources (e.g., such that services do not impact each other).

The federated ordered processor (e.g., the federated processor) may be mapped to one of the partitions and/or a federated topic. The federated ordered processor may continuously read messages and push the messages to a local queue (e.g., to one or more of the POP topics). A POP ordered processor (e.g., one of the POP processors) may be mapped to one of the partitions and/or to the POP topic. The POP ordered processor may continuously read the messages and push the messages to a local queue. If the service process is a concurrent processor, multiple routines may monitor for messages for every partition. Every routine may pull the messages and add the messages to a local queue of the routine.

In some aspects, in a case involving a federated ordered processor, a POP ordered processor, or a concurrent processor, the message bus proxy may transmit the message to one or more POPs (e.g., the remote message buses) based at least in part on a queue size of a queue associated with the message satisfying a configured batch size threshold or a batch time associated with the queue satisfying a configured batch time threshold. For example, a separate routine may check the queue to determine whether the queue size matches the configured batch size or whether the batch maximum time has been satisfied. If the queue size matches the configured batch size, or if the batch maximum time has been satisfied, then the processor may publish the messages to the POP queue/topic or to the remote message bus. Transmitting the message based at least in part on a queue size of a queue associated with the message satisfying a configured batch size threshold or a batch time associated with the queue satisfying a configured batch time threshold may help to ensure that the message buffers for no longer than a configurable amount of time.

In some aspects, the message transmitted by the producer may include a message key associated with an order of a plurality of messages, including the message, that are associated with the message key. For example, the producer may add a key (e.g., a message key) for every message. The message bus proxy may read the message key, which may be included in the message when the message is in the POP topic when the message is published to remote topics in the remote message buses. Thus, the message key (e.g., message partition) may be leveraged to support ordering of the messages.

As indicated above, FIG. 7 is provided as an example. Other examples may differ from what is described with regard to FIG. 7. The number and arrangement of devices shown in FIG. 7 are provided as an example. In practice, there may be additional devices, fewer devices, different devices, or differently arranged devices than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) shown in FIG. 7 may perform one or more functions described as being performed by another set of devices shown in FIG. 7.

Figure 8:
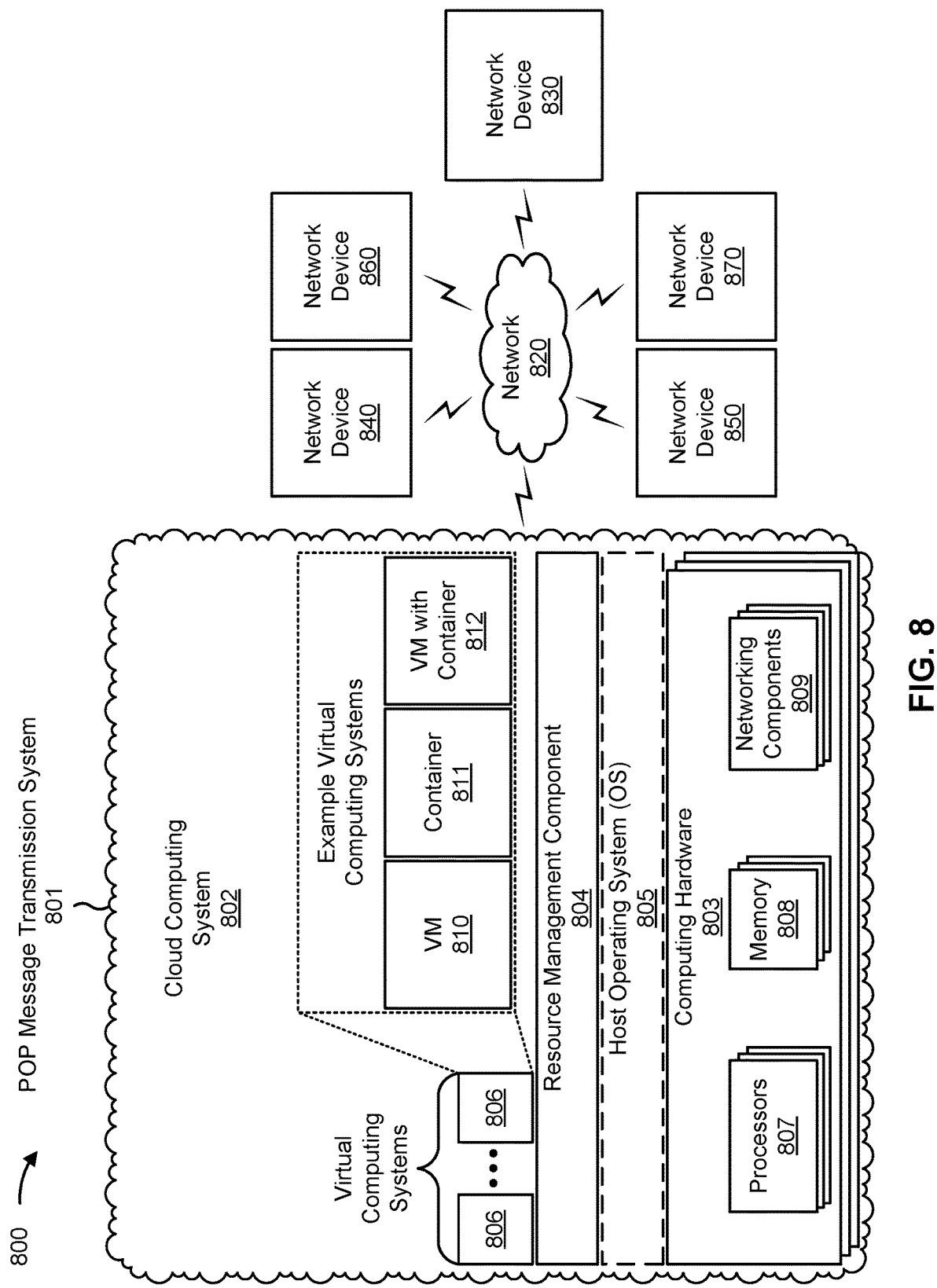
FIG. 8 is a diagram of an example environment in which systems and/or methods described herein may be implemented.

FIG. 8 is a diagram of an example environment 800 in which systems and/or methods described herein may be implemented. As shown in FIG. 8, environment 800 may include a POP message transmission system 801, which may include one or more elements of and/or may execute within a cloud computing system 802. The cloud computing system 802 may include one or more elements 803-812, as described in more detail below. As further shown in FIG. 8, environment 800 may include a network 820, network devices 830-870. Devices and/or elements of environment 800 may interconnect via wired connections and/or wireless connections.

The cloud computing system 802 may include computing hardware 803, a resource management component 804, a host operating system (OS) 805, and/or one or more virtual computing systems 806. The cloud computing system 802 may execute on, for example, an Amazon Web Services platform, a Microsoft Azure platform, or a Snowflake platform. The resource management component 804 may perform virtualization (e.g., abstraction) of computing hardware 803 to create the one or more virtual computing systems 806. Using virtualization, the resource management component 804 enables a single computing device (e.g., a computer or a server) to operate like multiple computing devices, such as by creating multiple isolated virtual computing systems 806 from computing hardware 803 of the single computing device. In this way, computing hardware 803 can operate more efficiently, with lower power consumption, higher reliability, higher availability, higher utilization, greater flexibility, and lower cost than using separate computing devices.

The computing hardware 803 may include hardware and corresponding resources from one or more computing devices. For example, computing hardware 803 may include hardware from a single computing device (e.g., a single server) or from multiple computing devices (e.g., multiple servers), such as multiple computing devices in one or more data centers. As shown, computing hardware 803 may include one or more processors 807, one or more memories 808, and/or one or more networking components 809. Examples of a processor, a memory, and a networking component (e.g., a communication component) are described elsewhere herein.

The resource management component 804 may include a virtualization application (e.g., executing on hardware, such as computing hardware 803) capable of virtualizing computing hardware 803 to start, stop, and/or manage one or more virtual computing systems 806. For example, the resource management component 804 may include a hypervisor (e.g., a bare-metal or Type 1 hypervisor, a hosted or Type 2 hypervisor, or another type of hypervisor) or a virtual machine monitor, such as when the virtual computing systems 806 are virtual machines 810. Additionally, or alternatively, the resource management component 804 may include a container manager, such as when the virtual computing systems 806 are containers 811. In some implementations, the resource management component 804 executes within and/or in coordination with a host operating system 805.

A virtual computing system 806 may include a virtual environment that enables cloud-based execution of operations and/or processes described herein using computing hardware 803. As shown, a virtual computing system 806 may include a virtual machine 810, a container 811, or a hybrid environment 812 that includes a virtual machine and a container, among other examples. A virtual computing system 806 may execute one or more applications using a file system that includes binary files, software libraries, and/or other resources required to execute applications on a guest operating system (e.g., within the virtual computing system 806) or the host operating system 805.

Although the POP message transmission system 801 may include one or more elements 803-812 of the cloud computing system 802, may execute within the cloud computing system 802, and/or may be hosted within the cloud computing system 802, in some implementations, the POP message transmission system 801 may not be cloud-based (e.g., may be implemented outside of a cloud computing system) or may be partially cloud-based. For example, the POP message transmission system 801 may include one or more devices that are not part of the cloud computing system 802, such as device 900 of FIG. 9, which may include a standalone server or another type of computing device. The POP message transmission system 801 may perform one or more operations and/or processes described in more detail elsewhere herein.

The network 820 may include one or more wired and/or wireless networks. For example, the network 820 may include a cellular network, a public land mobile network (PLMN), a local area network (LAN), a wide area network (WAN), a private network, the Internet, and/or a combination of these or other types of networks. The network 820 enables communication among the devices of the environment 800.

The network devices 830-870 may include one or more devices capable of receiving, generating, storing, processing, providing, and/or routing information associated with message transmission between POPs, as described elsewhere herein. The network devices 830-870 may include a communication device and/or a computing device. For example, the network devices 830-870 may include a server, such as a virtual server (e.g., executing on computing hardware) or a server in a cloud computing system. In some implementations, the network devices 830-870 may include computing hardware used in a cloud computing environment. In some examples, the network devices 830-870 may comprise one or more POPs where one or more messages are to be transmitted.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of the environment 800 may perform one or more functions described as being performed by another set of devices of the environment 800.

Figure 9:
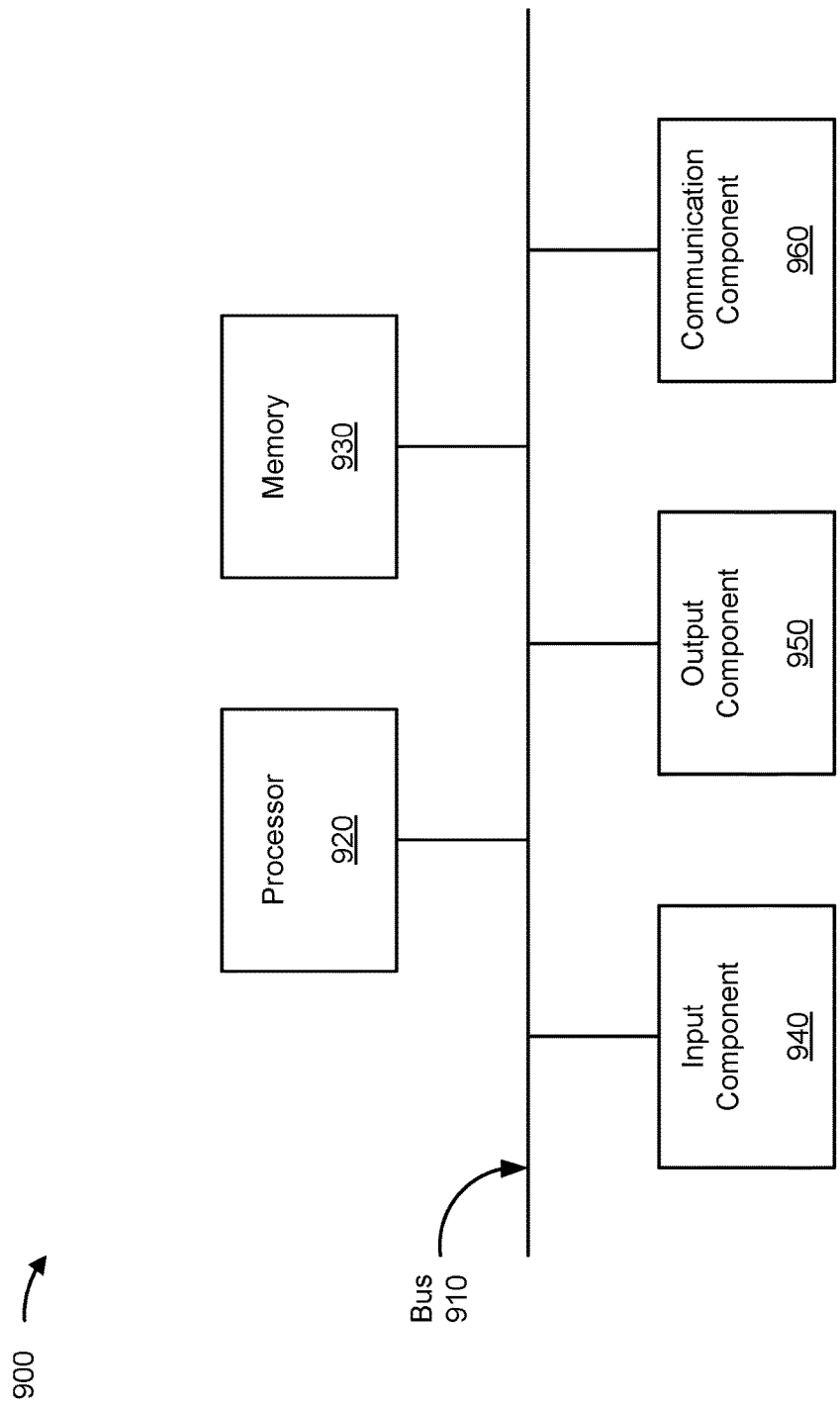
FIG. 9 is a diagram of example components of a device associated with transmission of messages between POPs.

FIG. 9 is a diagram of example components of a device 900 associated with transmission of messages between POPs. The device 900 may correspond to the POP message transmission system 801. In some implementations, the POP message transmission system 801 may include one or more devices 900 and/or one or more components of the device 900. As shown in FIG. 9, the device 900 may include a bus 910, a processor 920, a memory 930, an input component 940, an output component 950, and/or a communication component 960.

The bus 910 may include one or more components that enable wired and/or wireless communication among the components of the device 900. The bus 910 may couple together two or more components of FIG. 9, such as via operative coupling, communicative coupling, electronic coupling, and/or electric coupling. For example, the bus 910 may include an electrical connection (e.g., a wire, a trace, and/or a lead) and/or a wireless bus. The processor 920 may include a central processing unit, a graphics processing unit, a microprocessor, a controller, a microcontroller, a digital signal processor, a field-programmable gate array, an application-specific integrated circuit, and/or another type of processing component. The processor 920 may be implemented in hardware, firmware, or a combination of hardware and software. In some implementations, the processor 920 may include one or more processors capable of being programmed to perform one or more operations or processes described elsewhere herein.

The memory 930 may include volatile and/or nonvolatile memory. For example, the memory 930 may include random access memory (RAM), read only memory (ROM), a hard disk drive, and/or another type of memory (e.g., a flash memory, a magnetic memory, and/or an optical memory). The memory 930 may include internal memory (e.g., RAM, ROM, or a hard disk drive) and/or removable memory (e.g., removable via a universal serial bus connection). The memory 930 may be a non-transitory computer-readable medium. The memory 930 may store information, one or more instructions, and/or software (e.g., one or more software applications) related to the operation of the device 900. In some implementations, the memory 930 may include one or more memories that are coupled (e.g., communicatively coupled) to one or more processors (e.g., processor 920), such as via the bus 910. Communicative coupling between a processor 920 and a memory 930 may enable the processor 920 to read and/or process information stored in the memory 930 and/or to store information in the memory 930.

The input component 940 may enable the device 900 to receive input, such as user input and/or sensed input. For example, the input component 940 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 950 may enable the device 900 to provide output, such as via a display, a speaker, and/or a light-emitting diode. The communication component 960 may enable the device 900 to communicate with other devices via a wired connection and/or a wireless connection. For example, the communication component 960 may include a receiver, a transmitter, a transceiver, a modem, a network interface card, and/or an antenna.

The device 900 may perform one or more operations or processes described herein. For example, a non-transitory computer-readable medium (e.g., memory 930) may store a set of instructions (e.g., one or more instructions or code) for execution by the processor 920. The processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry may be used instead of or in combination with the instructions to perform one or more operations or processes described herein. Additionally, or alternatively, the processor 920 may be configured to perform one or more operations or processes described herein. Thus, implementations described herein are not limited to any specific combination of hardware circuitry and software.

The number and arrangement of components shown in FIG. 9 are provided as an example. The device 900 may include additional components, fewer components, different components, or differently arranged components than those shown in FIG. 9. Additionally, or alternatively, a set of components (e.g., one or more components) of the device 900 may perform one or more functions described as being performed by another set of components of the device 900.

Figure 10:
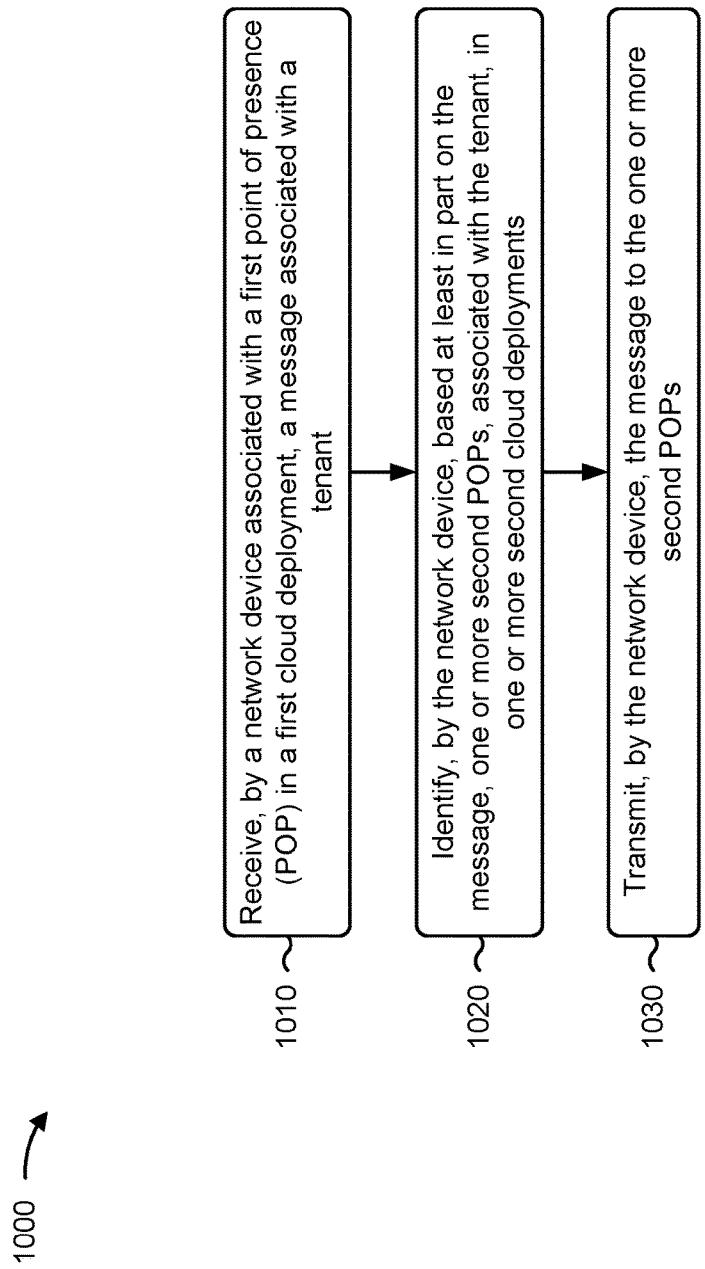
FIG. 10 is a flowchart of an example process associated with message transmission between POPs.

FIG. 10 is a flowchart of an example process 1000 associated with message transmission between POPs. In some implementations, one or more process blocks of FIG. 10 are performed by a one or more network devices (e.g., the POP message transmission system 801). In some implementations, one or more process blocks of FIG. 10 are performed by another device or a group of devices separate from or including the one or more network devices, such as network devices 830-870. Additionally, or alternatively, one or more process blocks of FIG. 10 may be performed by one or more components of device 900, such as processor 920, memory 930, input component 940, output component 950, and/or communication component 960.

As shown in FIG. 10, process 1000 may include receiving, by one or more network devices associated with a first point of presence (POP) in a first cloud deployment, a message associated with a tenant (block 1010). For example, the one or more network devices may receive, by one or more network devices associated with a first point of presence (POP) in a first cloud deployment, a message associated with a tenant, as described above.

As further shown in FIG. 10, process 1000 may include identifying based at least in part on the message, one or more second POPs, associated with the tenant, in one or more second cloud deployments (block 1020). For example, the one or more network devices may identify based at least in part on the message, one or more second POPs, associated with the tenant, in one or more second cloud deployments, as described above.

As further shown in FIG. 10, process 1000 may include transmitting the message to the one or more second POPs (block 1030). For example, the one or more network devices may transmit the message to the one or more second POPs, as described above.

Process 1000 may include additional implementations, such as any single implementation or any combination of implementations described below and/or in connection with one or more other processes described elsewhere herein.

In a first implementation, the message includes one or more of a logical grouping associated with the message, a payload, or a message key associated with an order of a plurality of messages, including the message, that are associated with the message key.

In a second implementation, alone or in combination with the first implementation, process 1000 includes buffering the message in a queue associated with network federation.

In a third implementation, alone or in combination with one or more of the first and second implementations, identifying the one or more second POPs comprises identifying an indication, in the message, that the message is associated with a global set of POPs associated with the tenant, and identifying, based at least in part on identifying the indication that the message is associated with the global set of POPs, the one or more second POPs, and process 1000 includes buffering the message in one or more queues respectively associated with the one or more second POPs.

In a fourth implementation, alone or in combination with one or more of the first through third implementations, identifying the one or more second POPs comprises identifying an indication, in the message, that the message is associated with a global set of POPs associated with the tenant, and identifying, based at least in part on identifying the indication that the message is associated with the global set of POPs, the one or more second POPs, and process 1000 includes buffering the message in a queue associated with a central POP.

In a fifth implementation, alone or in combination with one or more of the first through fourth implementations, identifying the one or more second POPs comprises identifying an indication, in the message, that the message is associated with a subset of POPs associated with the tenant, and identifying, based at least in part on identifying the indication that the message is associated with the subset of POPs, the one or more second POPs, and process 1000 includes buffering the message in one or more queues respectively associated with the one or more second POPs.

In a sixth implementation, alone or in combination with one or more of the first through fifth implementations, process 1000 includes receiving, from the one or more second POPs, one or more acknowledgements associated with the message.

In a seventh implementation, alone or in combination with one or more of the first through sixth implementations, process 1000 includes determining that a time window associated with acknowledgements associated with the message has expired, and retransmitting the message to the one or more second POPs.

In an eighth implementation, alone or in combination with one or more of the first through seventh implementations, identifying the one or more second POPs includes identifying the one or more second POPs based at least in part on a database that maps POPs, including the first POP and the one or more second POPs, to the tenant.

In a ninth implementation, alone or in combination with one or more of the first through eighth implementations, the database maintains a dynamic mapping of the POPs to the tenant.

In a tenth implementation, alone or in combination with one or more of the first through ninth implementations, the database maintains a dynamic indication of which of the POPs is a central POP for the tenant.

In an eleventh implementation, alone or in combination with one or more of the first through tenth implementations, process 1000 includes receiving a plurality of messages, including the message, from a plurality of tenants, including the tenant, and load-balancing the plurality of messages across a plurality of resources.

In a twelfth implementation, alone or in combination with one or more of the first through eleventh implementations, load-balancing the plurality of messages includes load-balancing the plurality of messages based at least in part on a plurality of first weights associated with a plurality of partitions and a plurality of second weights associated with the plurality of tenants.

In a thirteenth implementation, alone or in combination with one or more of the first through twelfth implementations, one or more first resources of the plurality of resources are associated with one or more first partitions, one or more second resources of the plurality of resources are associated with one or more second partitions, a first priority of the one or more first partitions is higher than a second priority of the one or more second partitions, and load-balancing the plurality of messages includes load-balancing one or more first messages of the plurality of messages among the one or more first partitions based at least in part on the one or more first messages being associated with a first tenant, of the plurality of tenants, that is associated with the first priority, or load-balancing one or more second messages of the plurality of messages among the one or more second partitions based at least in part on the one or more second messages being associated with a second tenant, of the plurality of tenants, that is associated with the second priority.

In a fourteenth implementation, alone or in combination with one or more of the first through thirteenth implementations, process 1000 includes predicting a message rate associated with the tenant.

In a fifteenth implementation, alone or in combination with one or more of the first through fourteenth implementations, the message is associated with a service, and process 1000 includes buffering the message in a queue associated with the service.

In a sixteenth implementation, alone or in combination with one or more of the first through fifteenth implementations, transmitting the message to the one nor more second POPs include transmitting the message to the one or more second POPs based at least in part on a queue size of a queue associated with the message satisfying a configured batch size threshold or a batch time associated with the queue satisfying a configured batch time threshold.

In a seventeenth implementation, alone or in combination with one or more of the first through sixteenth implementations, the message includes a message key associated with an order of a plurality of messages, including the message, that are associated with the message key.

Although FIG. 10 shows example blocks of process 1000, in some implementations, process 1000 includes additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by one or more network devices of a message bus of a first point of presence (POP), of a plurality of POPs, in a first cloud deployment, a message associated with a tenant of a multi-tenant computing environment, wherein the message bus includes a queue associated with a network federation and multiple queues associated with the plurality of POPs, and
    wherein a POP of the plurality of POPs comprises a plurality of network devices and wherein the POP is associated with a particular tenant of the multi-tenant computing environment;
    buffering, by the one or more network devices, the message in a queue associated with the network federation;
    forwarding, based on processing the message in the queue by a federated topic processor of the one or more network devices, the message in the queue to one or more POP topic processors of the one or more network devices;
    identifying, by the one or more network devices, based at least in part on the message, one or more second POPs, associated with the tenant, in one or more second cloud deployments; and
    transmitting, by the one or more network devices, the message to the one or more second POPs.

2. The method of claim 1, wherein the message includes one or more of a logical grouping associated with the message, a payload, or a message key associated with an order of a plurality of messages, including the message, that are associated with the message key.

3. The method of claim 1, wherein identifying the one or more second POPs comprises:
    identifying an indication, in the message, that the message is associated with a global set of POPs associated with the tenant.

4. The method of claim 1, wherein identifying the one or more second POPs comprises:
    identifying an indication, in the message, that the message is associated with a global set of POPs associated with the tenant; and
    identifying, based at least in part on identifying the indication that the message is associated with the global set of POPs, the one or more second POPs.

5. The method of claim 1, wherein identifying the one or more second POPs is based on identifying an indication that the message is associated with a subset of POPs associated with the tenant.

6. The method of claim 1, further comprising:
    receiving, from the one or more second POPs, one or more acknowledgements associated with the message.

7. The method of claim 1, further comprising:
    determining that a time window associated with acknowledgements associated with the message has expired; and
    retransmitting the message to the one or more second POPs.

8. The method of claim 1, wherein identifying the one or more second POPs includes:
    identifying the one or more second POPs based at least in part on a database that maps POPs, including the first POP and the one or more second POPs, to the tenant.

9. The method of claim 8, wherein the database maintains a dynamic mapping of the POPs to the tenant.

10. The method of claim 8, wherein the database maintains a dynamic indication of which of the POPs is a central POP for the tenant.

11. One or more network devices, comprising:
    one or more memories; and
    one or more processors to:
        receive a message associated with a tenant of a multi-tenant computing environment,
            wherein the one or more network devices are associated with a message bus of a first point of presence (POP) of a plurality of POPs,
            wherein the message bus includes a queue associated with a network federation and multiple queues associated with the plurality of POPs, and
            wherein a POP of the plurality of POPs comprises a plurality of network devices and wherein the POP is associated with a particular tenant of the multi-tenant computing environment;
        buffer the message in a queue associated with the network federation;
        forward, based on processing the message in the queue by a federated topic processor of the one or more network devices, the message in the queue to one or more POP topic processors of the one or more network devices;
        identify, based at least in part on the message, one or more second POPs, associated with the tenant, in one or more second cloud deployments; and
        transmit the message to the one or more second POPs.

12. The one or more network devices of claim 11, wherein the one or more processors are further to:
    receive a plurality of messages, including the message, from a plurality of tenants, including the tenant; and load-balance the plurality of messages across a plurality of resources.

13. The one or more network devices of claim 12, wherein the one or more processors, when load-balancing the plurality of messages, are to:
load-balance the plurality of messages based on a plurality of first weights associated with a plurality of partitions and a plurality of second weights associated with the plurality of tenants.

14. The one or more network devices of claim 12, wherein one or more first resources of the plurality of resources are associated with one or more first partitions, one or more second resources of the plurality of resources are associated with one or more second partitions, a first priority of the one or more first partitions is higher than a second priority of the one or more second partitions, and the one or more processors, when load-balancing the plurality of messages, are to:
load-balance one or more first messages of the plurality of messages among the one or more first partitions based at least in part on the one or more first messages being associated with a first tenant, of the plurality of tenants, that is associated with the first priority, or
load-balance one or more second messages of the plurality of messages among the one or more second partitions based at least in part on the one or more second messages being associated with a second tenant, of the plurality of tenants, that is associated with the second priority.

15. The one or more network devices of claim 11, wherein the one or more processors are further to:
predict a message rate associated with the tenant.

16. A non-transitory computer-readable medium storing a set of instructions, the set of instructions comprising:
one or more instructions that, when executed by one or more processors of one or more network devices, cause the one or more network devices to:
receive a message associated with a tenant of a multi-tenant computing environment,
wherein the one or more network devices are associated with a message bus of a first point of presence (POP) of a plurality of POPs,
wherein the message bus includes a queue associated with a network federation and multiple queues associated with the plurality of POPs, and
wherein a POP of the plurality of POPs comprises a plurality of network devices and wherein the POP is associated with a particular tenant of the multi-tenant computing environment;
buffer the message in a queue associated with the network federation;
forward, based on processing the message in the queue by a federated topic processor of the one or more network devices, the message in the queue to one or more POP topic processors of the one or more network devices;
identify, based at least in part on the message, one or more second POPs, associated with the tenant, in one or more second cloud deployments; and
transmit the message to the one or more second POPs.

17. The non-transitory computer-readable medium of claim 16, wherein the one or more instructions that cause the one or more network devices to transmit the message to the one or more second POPs cause the one or more network devices to:
transmit the message to the one or more second POPs based at least in part on a queue size of a queue associated with the message satisfying a configured batch size threshold or a batch time associated with the queue satisfying a configured batch time threshold.

18. The non-transitory computer-readable medium of claim 16, wherein the message includes a message key associated with an order of a plurality of messages, including the message, that are associated with the message key.

19. The non-transitory computer-readable medium of claim 16, wherein identifying the one or more second POPs is based on identifying an indication that the message is associated with a subset of POPs associated with the tenant.

20. The non-transitory computer-readable medium of claim 16, wherein identifying the one or more second POPs includes:
identifying the one or more second POPs based at least in part on a database that maps POPs, including the first POP and the one or more second POPs, to the tenant.

* * * * *